US011323782B1

(12) United States Patent
Hajduczenia (10) Patent No.: US 11,323,782 B1
(45) Date of Patent: May 3, 2022

(54) LOCATION-BASED VIDEO LINEUP SELECTION

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/347,719

(22) Filed: Jun. 15, 2021

(51) Int. Cl.
| | | |
|---|---|---|
| *H04N 21/858* | (2011.01) | |
| *H04L 61/106* | (2022.01) | |
| *H04L 61/4511* | (2022.01) | |
| *H04N 21/45* | (2011.01) | |
| *H04N 21/61* | (2011.01) | |
| *H04N 21/4627* | (2011.01) | |
| *H04N 21/643* | (2011.01) | |

(52) U.S. Cl.
CPC ....... *H04N 21/8586* (2013.01); *H04L 61/106* (2013.01); *H04L 61/1511* (2013.01); *H04N 21/4524* (2013.01); *H04N 21/4627* (2013.01); *H04N 21/6125* (2013.01); *H04N 21/6175* (2013.01); *H04N 21/64322* (2013.01)

(58) Field of Classification Search
CPC ........... H04N 21/8586; H04N 21/4524; H04N 21/4627; H04N 21/6125; H04N 21/6175; H04N 21/64322; H04L 61/106; H04L 61/1511
See application file for complete search history.

(56) References Cited

U.S. PATENT DOCUMENTS

| | | | | |
|---|---|---|---|---|
| 10,616,179 | B1* | 4/2020 | McCarriar | H04L 61/2514 |
| 10,931,786 | B1* | 2/2021 | Vasquez | H04L 67/327 |
| 11,038,745 | B1* | 6/2021 | Vasquez | H04L 41/0893 |
| 11,128,597 | B1* | 9/2021 | Johnson | H04L 67/1012 |
| 11,216,514 | B2* | 1/2022 | Statia | H04L 63/00 |
| 11,252,126 | B1* | 2/2022 | Thunga | H04L 12/4641 |
| 2011/0055374 | A1* | 3/2011 | Christenson | H04L 29/12301 709/224 |
| 2012/0084423 | A1* | 4/2012 | McGleenon | H04L 61/1511 709/223 |
| 2017/0329850 | A1* | 11/2017 | Statia | H04L 63/0236 |
| 2017/0353516 | A1* | 12/2017 | Gordon | H04L 67/02 |
| 2018/0084017 | A1* | 3/2018 | Borges | H04L 65/80 |

(Continued)

*Primary Examiner* — Fernando Alcon
(74) *Attorney, Agent, or Firm* — Mendelsohn Dunleavy, P.C.; Steve Mendelsohn (57) ABSTRACT

In certain embodiments, a video content (VC) client performs a two-stage address resolution process to determine how, if possible, to access "private only" video content such as Title VI video content. In the first stage, the VC client queries a public Domain Name System (DNS) server for the IP address(es) of a video content DNS (vcDNS) server containing the necessary video content records under the control of a VC provider. In the second stage, the VC client queries the vcDNS server for the VC provider's video content URL (vcURL) address(es), where each vcURL address indicates how the given video content is reachable. When the vcURL address is reachable via the public Internet, the given video content meets the Title II content rules. Alternatively, when the vcURL address is reachable only via the private video handoff link interface, the given video content meets the Title VI content rules.

18 Claims, 6 Drawing Sheets

(56) References Cited

U.S. PATENT DOCUMENTS

| | | | |
|---|---|---|---|
| 2018/0176176 A1* | 6/2018 | Kapur | H04L 67/10 |
| 2019/0007366 A1* | 1/2019 | Voegele | H04L 61/305 |
| 2019/0190894 A1* | 6/2019 | Kapoor | H04L 61/1511 |
| 2019/0238504 A1* | 8/2019 | Gupta | H04L 61/1511 |
| 2019/0268389 A1* | 8/2019 | Govindarajan | H04N 21/4405 |
| 2020/0021885 A1* | 1/2020 | Li | H04N 21/44204 |
| 2021/0073661 A1* | 3/2021 | Matlick | H04L 61/3025 |
| 2021/0258325 A1* | 8/2021 | Meyer | H04L 61/1511 |
| 2021/0314301 A1* | 10/2021 | Chanak | H04L 9/006 |
| 2021/0336932 A1* | 10/2021 | Chanak | H04L 63/0823 |
| 2022/0006797 A1* | 1/2022 | Lehtikuja | H04L 63/0442 |

* cited by examiner

LOCATION-BASED VIDEO LINEUP SELECTION

BACKGROUND

Field of the Disclosure

The present disclosure relates to the streaming of video content (VC) from VC providers to VC clients and, more specifically but not exclusively, to the streaming of VC in conformance with government regulations, such as those dictated by the U.S. Cable Communications Policy Act of 1984.

Description of the Related Art

This section introduces aspects that may help facilitate a better understanding of the disclosure. Accordingly, the statements of this section are to be read in this light and are not to be understood as admissions about what is prior art or what is not prior art.

Video content (VC) delivery to end users is a very complex topic these days, especially with the advent of over-the-top (OTT) delivery mechanisms, whereby a user is technically able to access the specific video content from anywhere as long as they have some sort of an Internet access to enable the streaming process. This technical ability to access video content from anywhere also creates problems for VC providers, whereby the delivery rights are limited, for example, to specific geographical locations and subject to very limited distribution rights. Furthermore, some video content may be prohibited from being distributed in the given country without specific retransmission rights. The rules governing distribution of video content are very complex and boil down to distribution contracts and agreements between specific VC providers, who take upon themselves to enforce the geographical enforcement.

For example, the U.S. Cable Communications Policy Act of 1984 defines different types of video content and dictates how such video content may be distributed from VC providers to VC clients. In particular, the so-called Title II video content is allowed to be transmitted via the public Internet, while the so-called Title VI video content requires a dedicated video handoff link that bypasses the public Internet altogether.

In a general case, a VC client is not pre-configured with information identifying how it is connected to a given VC provider. This allows the VC client to be deployed in a variety of network configurations without the need to customize the VC client itself. In particular, the VC client is typically not aware whether it has the option to receive video content from the VC provider over a dedicated video handoff link that bypasses the public Internet or whether such video content necessarily involves at least some transmission over the public Internet. A VC client does not know, therefore, whether it can access Title VI video content in addition to Title II video content from the VC provider.

SUMMARY

Problems in the prior art are addressed in accordance with the principles of the present disclosure by providing a technique that allows a VC client to determine whether it can receive "private only" video content, such as Title VI video content, from a particular VC provider and, if so, enables the VC client to do so. According to certain embodiments, the VC client performs a two-stage address resolution process in which, in the first stage, the VC client queries a public Domain Name System (DNS) server for the Internet Protocol (IP) address of a video content DNS (vcDNS) server containing the necessary video content records under the control of the VC provider. In the second stage, the VC client queries the vcDNS server for the VC provider's video content URL (vcURL) address (i.e., the Universal Resource Locator address of the VC content), where the vcURL address indicates how the given video content is reachable. When the vcURL address is reachable via the public Internet, the given video content meets the Title II content rules. Alternatively, when the vcURL address is reachable only via the private video handoff link, the given video content meets the Title VI content rules.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
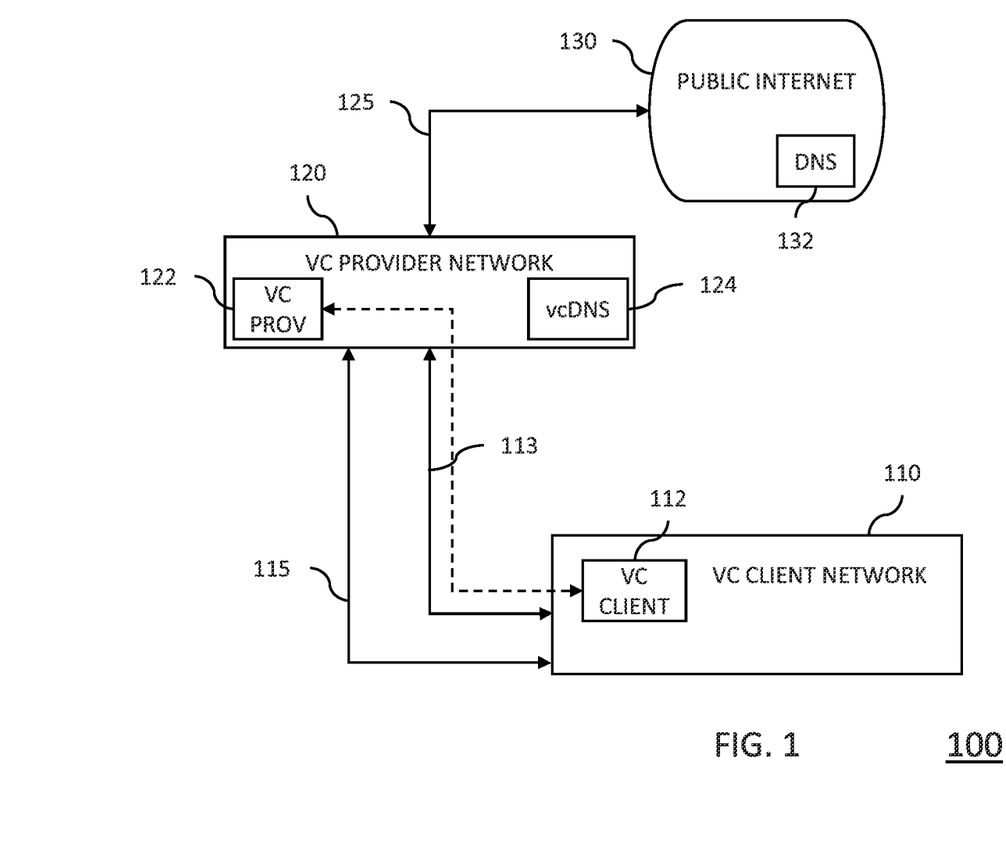
FIGS. 1-4 are block diagrams of four different possible architectures for a VC client configured to receive video content from a VC provider.

FIG. 1 is a block diagram of a first possible architecture 100 for a VC client 112 configured to receive video content from a VC provider 122. In this particular scenario, the VC provider 122 delivers video handoff service via video handoff link 113 as well as Internet access service via Internet access link 115 to the VC client 112. There is no backup Internet access service available in this case. All VC traffic is designated with a dashed line. In this situation, the VC client network 110 performs selective routing, whereby any VC traffic is routed across the video handoff link 113 towards the VC provider network 120 (as shown by the dashed line in FIG. 1). All the traffic bound to the public Internet GB is routed following the default route across the Internet access links 115 and 125 from the VC provider network 120.

Due to Title VI restrictions and the requirement to deliver any video content across a physical handoff interface to the customer, even though the VC provider 122 may provide the VC client with a single physical device with the service User Network Interface (UNI), capable of performing all the necessary traffic filtering and selective forwarding, taking the responsibility for isolating VC traffic and forwarding it across the video handoff link 113, the legal requirements from Title VI VC delivery are not met. The VC client network 110 remains responsible for directing all Title VI VC traffic towards the appropriate handoff interface. Note that any misconfiguration in the VC client network 110 results in all VC traffic attempting to traverse the primary or backup Internet access link 115 and will result in restriction of video content to Title II only.

In particular, as shown in FIG. 1, the VC provider network 120 provides the VC client 112 with access to the public Internet 130 via Internet access links 115 and 125. In addition to that Internet access, the VC provider network 120 provides a dedicated video handoff link 113 for providing video content from the VC provider 122 to the VC client 112. As such, for this architecture 100, in addition to being able to receive Title II video content from the VC provider 122 via the Internet access links 115 and 125 or the video handoff link 113, the VC client 112 is also able to receive Title VI video content via the video handoff link 113 because that flow of Title VI video content bypasses the public Internet 130 altogether.

When the VC client 112 receives Title 11 video content from the VC provider 122 via the Internet access link 115, the video content flows from the VC provider 122 via the Internet access link 125 to the public Internet 130 and then back from the public Internet 130 via the Internet access link 125 to the VC provider network 120 and via the Internet access link 115 to the VC client 112. On the other hand, when the VC client 112 receives Title II or Title VI video content from the VC provider 122 via the video handoff link 113, the video content flows from the VC provider 122 directly to the VC client 112 via the video handoff link 213, thereby bypassing the public Internet 130 altogether. If and when the video handoff link 113 becomes unavailable, then the VC client 112 will still be able to receive Title II video content from the VC provider 122 via the Internet access links 115 and 125, but not Title VI video content.

Figure 2:
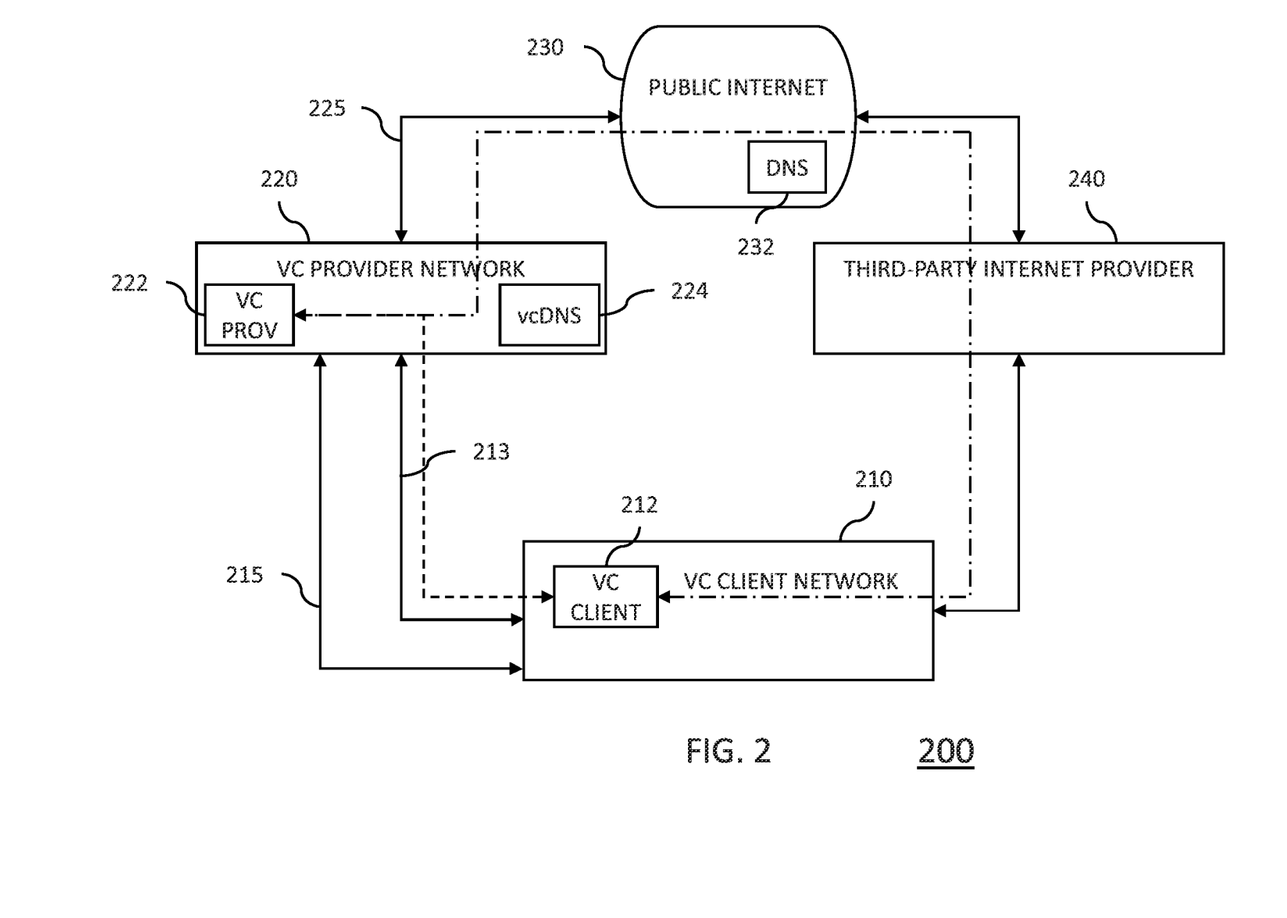

FIG. 2 is a block diagram of a second possible architecture 200 for a VC client 212 configured to receive video content from a VC provider 222. This second architecture 200 is similar to the first architecture 100 of FIG. 1 with analogous elements labeled with similar labels, except that the second architecture 200 provides the VC client 212 with backup ability to access the public Internet 230 via a third-party Internet provider 240. As such, under normal operations in which Internet access is provided by the VC provider network 220, in addition to being able to receive Title 11 video content from the VC provider 222 via either the Internet access links 215 and 225 or the dedicated video handoff link 213, the VC client 212 is also able to receive Title VI video content via the video handoff link 213 (as shown by the dashed line in FIG. 2) because that flow of Title VI video content bypasses the public Internet 230 altogether.

If and when the video handoff link 213 becomes unavailable, then the VC client 212 will still be able to receive Title 11 video content from the VC provider 222 via the public Internet 230, but not Title VI video content. If and when the Internet access link 215 becomes unavailable, then the VC client 212 will still be able to receive Title II video content from the VC provider 222 via the third-party Internet provider 240 (as shown in the dashed-dotted line in FIG. 2).

Figure 3:
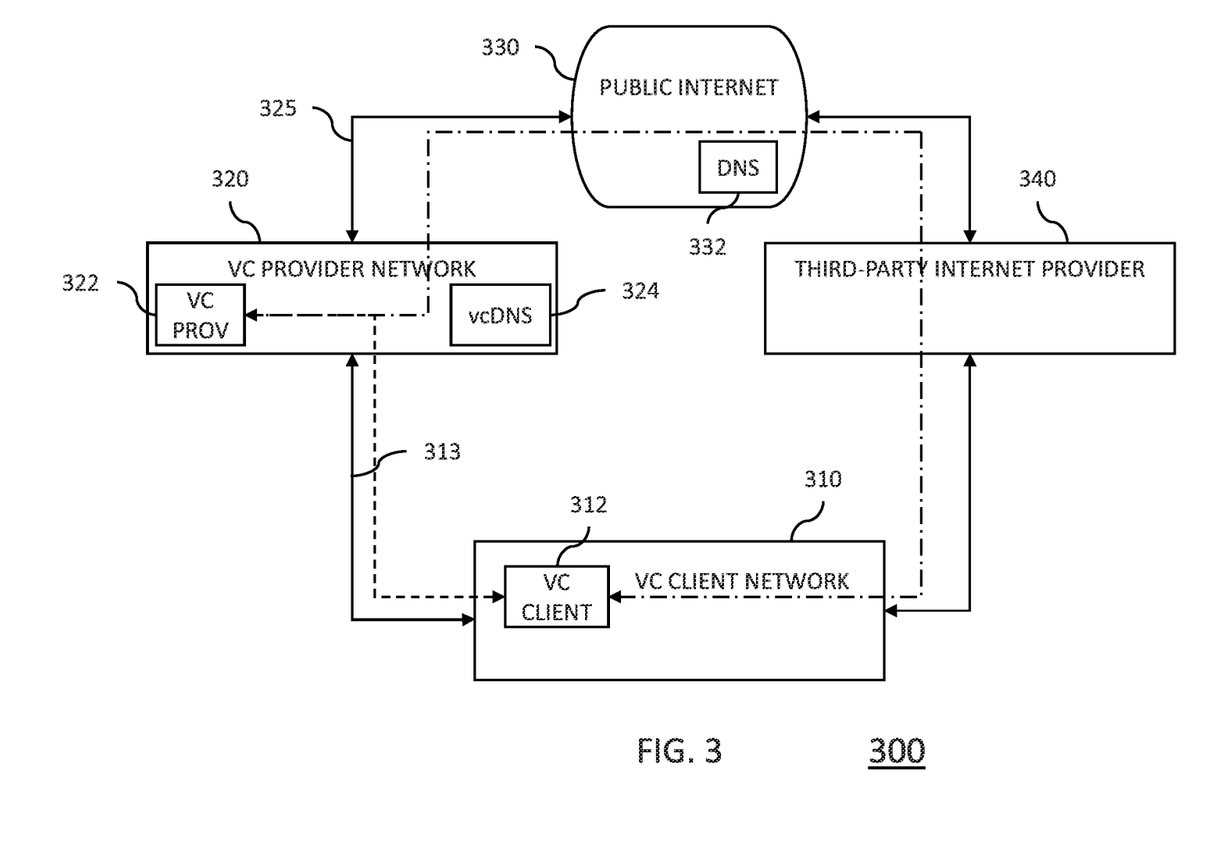

FIG. 3 is a block diagram of a third possible architecture 300 for a VC client 312 configured to receive video content from a VC provider 322. This third architecture 300 is similar to the second architecture 200 of FIG. 2 with analogous elements labeled with similar labels, except that, in the third architecture 300, access to the public Internet 330 is provided to the VC client 312 only via a third-party Internet provider 340 and not via the VC provider network 320. As such, under normal operations, the VC client 312 is able to receive Title II and Title VI video content directly from the VC provider 322 via the video handoff link 313 (as shown by the dashed line in FIG. 3) and/or Title II video content from the VC provider 322 via the public Internet 330 and the third-party Internet provider 340. If and when the video handoff link 313 becomes unavailable, then the VC client 312 will still be able to receive Title 11 video content from the VC provider 322 via the public Internet 330 and the third-party Internet provider 340 (as shown by the dashed-dotted line in FIG. 3), but not Title VI video content.

Figure 4:
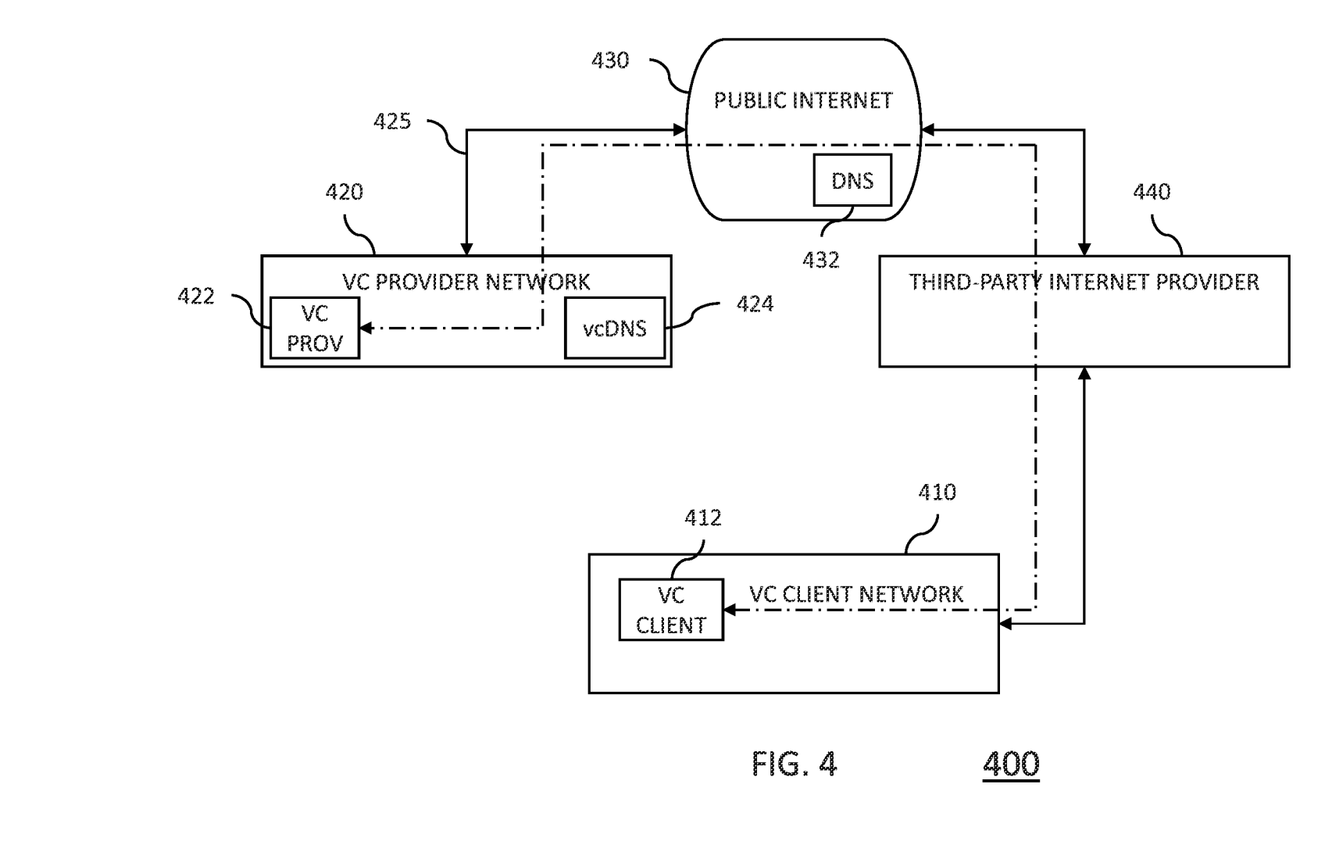

FIG. 4 is a block diagram of a fourth possible architecture 400 for a VC client 412 configured to receive video content from a VC provider 422. This fourth architecture 400 is similar to the third architecture 300 of FIG. 3 with analogous elements labeled with similar labels, except that the fourth architecture 400 has no dedicated video handoff link connecting the VC client 412 and the VC provider 422. In this architecture 400, the VC client 412 is completely off-net (relative to the VC provider network 420 footprint) and does not have Internet, Ethernet, or Video services from the VC provider 422. As such, the VC client 412 is able to receive only Title 11 video content from the VC provider 422 via the public Internet 430 and the third-party Internet provider 440 (as shown by the dashed-dotted line in FIG. 4), but not any Title VI video content. This scenario corresponds to a typical Internet-streaming scenario, in which only Title II video content allowed to transit the public Internet may be streamed. The delivery of any Title VI video content is not legally allowed, due to the lack of a dedicated data path between the VC provider 422 and the VC client 412 on the VC client network 410.

Note that, in the above-described architectures 100-400 of FIGS. 1-4, the video handoff link and the Internet access link are physically separate (wireless or wireline) connections between the VC provider network and the VC client network.

As will be appreciated by a person of ordinary skill in the art, there are other possible architectures besides those shown in FIGS. 1-4, including those with multiple different VC providers configured to a particular VC client in one or more different ways. As described previously, in any of these different possible architectures, when the VC client is initially provisioned, it may be unaware of the details of its particular architecture and whether and how it can access Title VI video content in addition to Title II video content.

All Title VI video content must not be routed across the public Internet, irrespective of whether Internet access is provided by very same VC provider or a third party Internet provider. All Title VI video content must be routed across a dedicated VC-provider-delivered video handoff link and be transported wholly within their network.

Any Title II video content may be routed across the public Internet, irrespective of whether Internet access is provided by very same VC provider or a third party Internet provider.

The channel/content lineups in Title VI and non-Title VI situations may be different, whereby the IP Virtual Server (IPVS) builds the appropriate channel lineup in the function of the VC client location in the network. When the target VC client is on-net (also referred to as in-home, Title VI scenario), the access to specific Title VI channels may be granted. When the target VC client is off-net (also referred to as out-of-home, Title II scenario), the access to Title VI channels is restricted. The target VC client identification is based on the VC client network IP address either through association with a specific service type (e.g., customer is on residential VC provider network, behind a cable modem with IP address belonging to VC provider) or through whitelisting specific selected customer-owned IP addresses (e.g., a video customer on a University network, served by a VC provider).

The changes to the client video application (whatever form it comes in, including applications on other platforms, for example, Hulu, Apple TV, smart TVs, smartphones, etc.) required to adapt to the Title II/Title VI content routing must be minimized, whereby the application itself is able to discover its network surrounding, context, as well as target location for the requested video content. Given the lack of access to the system stack in most cases, any changes to the system network stack are not allowed for obvious reasons. The video client application (VCA) should therefore be able to acquire information on the VC provider location via the VC URL (vcURL), at best in an automated manner, and without any changes to its code over time, and acquire the target VC provider with minimum involvement from the VC client network configuration.

In order to properly resolve the vcURL address of the target VC provider in the function of the client location and irrespective of the relationship between the VC client and the VC provider, a two-stage DNS lookup is used, whereby the VC client performs actions before obtaining access to the given video content in a correct manner.

Figure 5:
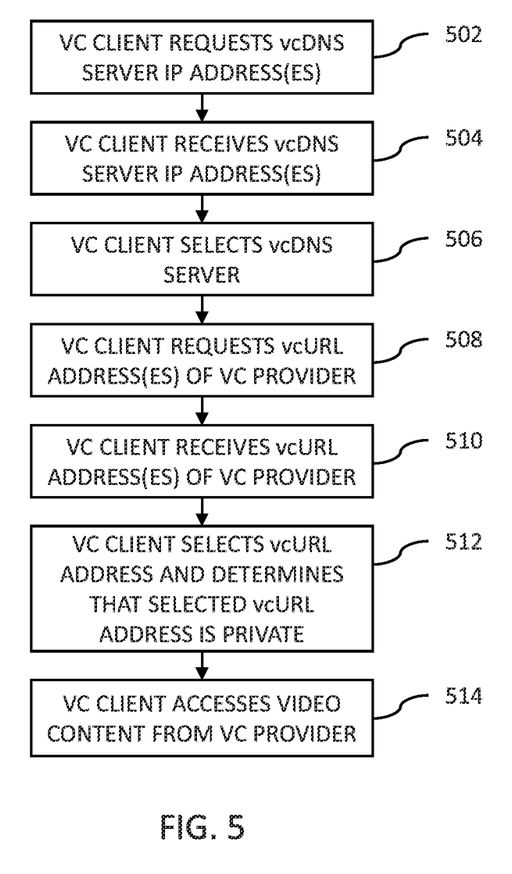
FIG. 5 is a flow diagram of the processing performed by a VC client to determine whether and how it can access Title VI video content in addition to Title II video content from a VC provider.

FIG. 5 is a flow diagram of the processing performed by a VC client to determine whether and how it can access Title VI video content in addition to Title II video content from a VC provider. The processing involves two stages. In the first stage, the VC client requests and receives, from a public Domain Name System (DNS) server hosted on the public Internet, a list of one or more IP addresses of video content DNS servers (referred to herein as "vcDNS servers") in VC provider networks that provide video content. In the second stage, the VC client uses the list of IP addresses for the one or more vcDNS servers to determine the video content Uniform Resource Locator (URL) address (referred to herein as the "vcURL address") for the VC provider associated with (i.e., in the same VC provider network as) one of the vcDNS servers on the list.

The process flow of FIG. 5 focuses on the behavior changes required from the VC client implemented on any target platform, for example, Android smartphones, Apple TV, Roku, etc. The target behavior is substantially extended from the existing standard implementations, where the VC client performs vcURL resolution against the public DNS and has no way to differentiate between Title VI and Title II video content and enforce a specific routing across the VC client network.

The following describes the processing of FIG. 5 in the context of the first architecture 100 of FIG. 1. Those skilled in the art will understand how to implement the processing of FIG. 5 in other possible architectures, such as those shown in FIGS. 2-4.

In step 502, the VC client 112 transmits a request, via the Internet access links 115 and 125 to public DNS server 132, for the IP address(es) (e.g., IPv4/IPv6 addresses) of available vcDNS server(s) and, in step 504, the public DNS server 132 responds by transmitting, via the Internet access links 125 and 115 back to the VC client 112, a list of one or more IP addresses for one or more available vcDNS servers, which includes the IP address of the vcDNS server 124 in the VC provider network 120. Steps 502 and 504 perform a DNS lookup for one of the VC-provider-controlled DNS servers using any of the available public DNS server(s), using public records (address) for any of the VC-provider-controlled DNS server (vcDNS). This ensures that the translation from a vcURL address to a specific IP address is performed using vcDNS controlled by and maintained by the VC provider, the records on which can be updated as required, including the support for the source-specific address resolution.

In step 506, the VC client 112 selects one of the vcDNS servers in the list of IP addresses received from the public DNS server 132. Depending on the implementation, the VC client 112 may select (i) the first vcDNS server in the list, (ii) a random vcDNS server in the list, (iii) a specific vcDNS server in the list applying a round-robin selection technique for load-balancing purposes, or (iv) any other suitable selection technique. In addition or in the alternative, the public DNS server 132 may vary the order of the vcDNS server address(es) in the list over time using a round-robin or other suitable selection technique. For this example implementation of the processing of FIG. 5, whichever selection technique is employed, the result is the VC client 112 selecting a vcDNS server 124.

Once the vcDNS record is identified, the VC client becomes aware of which vcDNS to use for all vcURL-associated address resolution. The source-specific address resolution on the vcDNS may be implemented in a variety of ways, including, for example, maintaining different DNS instances and directing specific queries to specific DNS instances based on their source address, or using DNS views, or using any other combination of source-specific address resolution techniques in combination with the source network information (public IP address), client identification, etc. These may be represented using an "address-based re-director," where each address-specific DNS view may be represented by a separate address-specific view card. In the example of FIG. 5, only the VC client-specific DNS view responds to the vcURL query. This represents a major configuration and behavioral change in the way DNS is typically configured today for production purposes, offering a single view (instance) only, with no address-based re-director function enabled.

In step 508, the VC client 112 transmits a request, via the Internet access links 115 and 125 to the vcDNS server 124, for the vcURL address(es) of the VC provider 122 in the same VC provider network 120 as the vcDNS server 124 and, in step 510, the vcDNS server 124 transmits a list of the one or more vcURL addresses of the VC provider 122 back to the VC client 112 via the Internet access links 125 and 115. Note that the request from the VC client 112 travels via the Internet access link 115 through the VC provider network 120 to the public Internet 130 via the Internet access link 125 and then back to the vcDNS server 124 via the Internet access link 125, and that the response from the vcDNS server 124 likewise travels via the Internet access link 125 to the public Internet 130 and back through the VC provider network 120 via the Internet access links 125 and 115 to the VC client 112.

In steps 508 and 510, the VC client performs a DNS lookup for the selected vcURL address describing the given video content (for example, specific video stream) against the vcDNS. The vcDNS is pre-configured and maintained by the VC provider 122 in the VC provider network 120 to deliver a source-specific address resolution for the vcURL address. The following scenarios are possible.

When the VC client vcURL query originates from a public IP address that is not associated with any specific video customer, the vcDNS resolves the vcURL address(es) to the VC address(es) reachable via the public Internet. In this case, the VC client will be allowed to access only Title 11 content given the lack of a dedicated VC path required for Title VI-compliant delivery.

When the VC client vcURL query originates from a public IP address that is associated with a known and specific VC client using the video handoff link from the VC provider, the vcDNS resolves the vcURL address(es) to the VC address(es) reachable exclusively via the video handoff link from the VC provider. Such address(es) would belong to a private IP scope, not routable on the public Internet due to allocation of a private IPv4 address space (for example, RFC 1918 address space) or explicit restriction of routing the given IPv4/IPv6 space to the internal VC provider network only. This blocks the possibility of associated video content being routed across the public Internet, meeting all the requirements for Title VI-compatible delivery of the given video content.

When the VC client vcURL query originates from a private IP address known to belong to one of the VC provider IP scopes assigned to a specific VC client network using at least a video handoff link from the VC provider, the vcDNS resolves the vcURL address(es) to the VC address(es) reachable exclusively via the video handoff link from the VC provider. Such address(es) would belong to a private IP scope, not routable on the public Internet due to allocation of a private IPv4 address space (for example, RFC 1918 address space) or explicit restriction of routing the given IPv4/IPv6 space to the internal VC provider network only. This blocks the possibility of associated video content being routed across the Public Internet, meeting all the requirements for Title VI-compatible delivery of the given video content.

In step 512, the VC client 112 selects a vcURL address of the VC provider 122 from the list of one or more vcURL addresses received from the vcDNS server 124 using a suitable selection technique such as round robin, first in list, random, etc., and determines whether the selected vcURL address is a private URL address corresponding to a dedicated video handoff link or a public URL address that involves the public Internet 130. In some implementations, the VC client 112 may be configured with information that a particular range of vcURL prefixes indicates private URL addresses corresponding to dedicated video handoff links, where that information can be either advertised (e.g., via Border Gateway Protocol (BGP) routing) or pre-configured as static routes on the VC client network 110. For this example implementation of the processing of FIG. 5, based on the prefix of the vcURL address provided by the vcDNS server 124, the VC client 112 determines that the vcURL address is a private URL address corresponding to the dedicated video handoff link 113.

Once the vcURL address has been resolved in step 512, the VC client continues with the standard video stream initiation, reaching out for the specific video content identified via the resolved vcURL address. The following scenarios are possible.

In a first scenario, the VC client reaches out for Title VI-compatible video content across the video handoff link 113 into the VC-managed Content Delivery Network (CDN) (i.e., the VC provider network 120). In this case, access is granted if (i) the given VC client is properly authorized for access, (ii) the video handoff link 113 is accessible, and (iii) the VC client network 110 routing is configured properly.

In a second scenario, the VC client reaches out for Title II-compatible video content across at least one of the available public Interface access link(s) 115 into the VC provider 122. In this case, access is granted if the given VC client is properly authorized for access and the VC client network 110 routing is configured properly.

In a third scenario, the VC client attempts to reach out for Title VI-compatible video content with no available video handoff link 113. In this case, the video content remains inaccessible given the private IP addressing associated with the VC delivery.

In step 514 of the example scenario of FIG. 5, the VC client 112 uses the vcURL address to access video content from the VC provider 122. If the vcURL address is a private address, then the VC client 112 uses the vcURL address to access either Title VI or Title II video content via the dedicated video handoff link 113. If the vcURL address is a public address, then the VC client 112 uses the vcURL address to access Title II video content via the public Internet 130.

Note that, similar to the architecture 100 of FIG. 1, for the architectures 200 and 300 of FIGS. 2 and 3, the vcURL addresses provided by the vcDNS servers 224 and 324 will be private URL addresses corresponding to the dedicated video handoff links 215 and DF, but that the vcURL address provided by the vcDNS server 424 of the architecture 400 of FIG. 4 will be a public URL address indicating the absence of a dedicated video handoff link. In general, when a vcURL address gets resolved to a private URL address, any Title VI video content will be provided via the corresponding dedicated video handoff link without traversing the public Internet. When a vcURL address gets resolved to a public URL address, Title VI video content will not be allowed using that vcURL address, and any Title II video content will traverse the public Internet.

Figure 6:
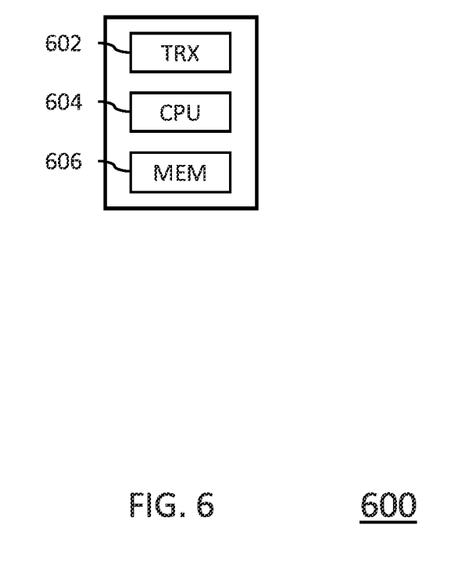
FIG. 6 is a simplified hardware block diagram of an example VC client that can be used to implement any of the VC clients or vcDNS servers of FIGS. 1-4.

FIG. 6 is a simplified hardware block diagram of an example VC client 600 that can be used to implement any of the VC clients 112-412 of FIGS. 1-4. As shown in FIG. 6, the VC client 600 includes communication hardware (e.g., wireless and/or wireline transceivers (TRX)) 602 that supports communications with external nodes via private and/or public links, a processor (e.g., CPU microprocessor) 604 that controls the operations of the VC client 600, and a memory 606 that stores code executed by the processor 604 and/or data generated and/or received by the VC client 600. Note that the vcDNS servers 124-424 of FIGS. 1-4 may be implemented using analogous configurations of communication hardware, processors, and memories.

Although the present disclosure has been described in the context of video content that is either Title II video content or Title VI video content, in general, the present disclosure can apply to any suitable situation in which (i) some video content is "private only" video content (e.g., Title VI video content) that must be transmitted via only dedicated video handoff links and (ii) other video content is "public" video content (e.g., Title 11 video content) that may be transmitted via either dedicated video handoff links or the public Internet.

In certain embodiments, the present disclosure is a VC client comprising transceiver equipment configured to communicate with one or more external nodes, a processor configured to control operations of the transceiver equipment, and memory configured to store code and/or data for the processor. The processor is configured to control the VC client to transmit, to a public Domain Name System (DNS) server, a request for an Internet protocol (IP) address of at least one video content DNS (vcDNS) server; receive, from the public DNS server, one or more IP addresses of one or more vcDNS servers; select a vcDNS server from the one or more vcDNS servers; transmit, to the selected vcDNS server, a request for a video content Uniform Resource Locator (vcURL) of a VC provider associated with the vcDNS server; receive, from the vcDNS server, a list of one or more IP addresses corresponding to the vcURL of the VC provider; select a vcURL address from the list of one or more IP addresses corresponding to the vcURL; determine whether the selected vcURL address is a public URL address or a private URL address; and access "private only" video content from the VC provider via a video handoff link, if the selected vcURL address is a private URL address corresponding to the video handoff link.

In at least some of the above embodiments, wherein access to the "private only" video content does not traverse the public Internet.

In at least some of the above embodiments, the VC client is configured to access public video content from the VC provider via the public Internet.

In at least some of the above embodiments, the "private only" video content is Title VI video content according to U.S. Cable Communications Policy Act of 1984; and the public video content is Title II video content according to the U.S. Cable Communications Policy Act of 1984.

In at least some of the above embodiments, the VC client may be configured to access the public video content via the video handoff link.

In certain embodiments, the present disclosure is a vcDNS server comprising transceiver equipment configured to communicate with one or more external nodes; a processor configured to control operations of the transceiver equipment; and memory configured to store code and/or data for the processor. The processor is configured to control the vcDNS server to receive a request from a VC client for a vcURL of a VC provider associated with the vcDNS server; resolve the VC client's address; and transmit, to the VC client, a list of one or more IP addresses corresponding to the vcURL of the VC provider based on the resolved address of the VC client. The list of one or more IP addresses contains one or more public URL addresses if the resolved address of the VC client indicates that video content transmitted from the VC provider to the VC client will traverse the public Internet; and the list of one or more IP addresses contains one or more private URL addresses if the resolved address of the VC client indicates that video content transmitted from the VC provider to the VC client will not traverse the public Internet.

In at least some of the above embodiments, the video content that will traverse the public Internet is Title II video content according to U.S. Cable Communications Policy Act of 1984, and the video content that will not traverse the public internet comprises Title VI video content according to the U.S. Cable Communications Policy Act of 1984.

In at least some of the above embodiments, the video content that will not traverse the public Internet is configured to be transmitted from the VC provider to the VC client via a dedicated video handoff link.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A video content (VC) client comprising:
   transceiver equipment configured to communicate with one or more external nodes;
   a processor configured to control operations of the transceiver equipment; and
   memory configured to store code and/or data for the processor, wherein the processor is configured to control the VC client to perform a two-stage address resolution process comprising a first stage and a second stage, wherein:
      for the first stage, the VC client is configured to:
         transmit, to a public Domain Name System (DNS) server, a request for an Internet protocol (IP) address of at least one video content DNS (vcDNS) server;
         receive, from the public DNS server, one or more IP addresses of one or more vcDNS servers; and
         _select a vcDNS server from the one or more vcDNS servers;

for the second stage, the VC client is configured to:
   transmit, to the selected vcDNS server, a request for a video content Uniform Resource Locator (vcURL) of a VC provider associated with the vcDNS server;
   receive, from the vcDNS server, a list of one or more IP addresses corresponding to the vcURL of the VC provider;
   select a vcURL address from the list of one or more IP addresses corresponding to the vcURL; and
   determine whether the selected vcURL address is a public URL address or a private URL address; and
the VC client is further configured to access "private only" video content from the VC provider via a private video handoff link, if the selected vcURL address is a private URL address corresponding to the private video handoff link.

2. The VC client of claim 1, wherein access to the "private only" video content does not traverse the public Internet.

3. The VC client of claim 1, wherein the VC client is configured to access public video content from the VC provider via the public Internet.

4. The VC client of claim 3, wherein:
the "private only" video content is Title VI video content according to U.S. Cable Communications Policy Act of 1984; and
the public video content is Title II video content according to the U.S. Cable Communications Policy Act of 1984.

5. The VC client of claim 1, wherein the VC client may be configured to access the public video content via the iv video handoff link.

6. A method for a VC client, the method comprising:
the VC client performing a two-stage address resolution process comprising a first stage and a second stage, wherein:
   for the first stage, the method comprises:
      the VC client transmitting, to a public Domain Name System (DNS) server, a request for an Internet protocol (IP) address of at least one video content DNS (vcDNS) server;
      the VC client receiving, from the public DNS server, one or more IP addresses of one or more vcDNS servers; and
      the VC client selecting a vcDNS server from the one or more vcDNS servers;
   for the second stage, the method comprises:
      the VC client transmitting, to the selected vcDNS server, a request for a video content Uniform Resource Locator (vcURL) address of a VC provider associated with the vcDNS server;
      the VC client receiving, from the vcDNS server, a list of one or more IP addresses associated with the vcURL of the VC provider;
      the VC client selecting a vcURL address from the list of one or more IP addresses corresponding to the vcURL; and
      the VC client determining whether the selected vcURL address is a public URL address or a private URL address; and
the method further comprises the VC client accessing "private only" video content from the VC provider via a private video handoff link, if the selected vcURL address is a private URL address corresponding to the private video handoff link.

7. The method of claim 6, wherein access to the "private only" video content does not traverse the public Internet.

8. The method of claim 6, wherein the VC client accesses public video content from the VC provider via the public Internet.

9. The method of claim 8, wherein:
the "private only" video content is Title VI video content according to U.S. Cable Communications Policy Act of 1984; and
the public video content is Title II video content according to the U.S. Cable Communications Policy Act of 1984.

10. The method of claim 6, wherein the VC client accesses public video content via the private video handoff link.

11. A video content Domain Name System (vcDNS) server comprising:
transceiver equipment configured to communicate with one or more external nodes;
a processor configured to control operations of the transceiver equipment; and
memory configured to store code and/or data for the processor, wherein the processor is configured to control the vcDNS server to:
   receive a request from a VC client for a vcURL of a VC provider associated with the vcDNS server;
   resolve the VC client's address; and
   transmit, to the VC client, a list of one or more IP addresses corresponding to the vcURL of the VC provider based on the resolved address of the VC client, wherein:
      the list of one or more IP addresses contains one or more public URL addresses if the resolved address of the VC client indicates that video content transmitted from the VC provider to the VC client will traverse the public Internet; and
      the list of one or more IP addresses contains one or more private URL addresses if the resolved address of the VC client indicates that video content transmitted from the VC provider to the VC client will not traverse the public Internet.

12. The vcDNS server of claim 11, wherein:
the video content that will traverse the public Internet is Title II video content according to U.S. Cable Communications Policy Act of 1984; and
the video content that will not traverse the public internet comprises Title VI video content according to the U.S. Cable Communications Policy Act of 1984.

13. The vcDNS server of claim 11, wherein the video content that will not traverse the public Internet is configured to be transmitted from the VC provider to the VC client via a dedicated private video handoff link.

14. A method for a vcDNS server, the method comprising:
the vcDNS server receiving a request from a VC client for a vcURL of a VC provider associated with the vcDNS server;
the vcDNS server resolving the VC client's address; and
the vcDNS server transmitting, to the VC client, a list of one or more IP addresses corresponding to the vcURL of the VC provider based on the resolved address of the VC client, wherein:
   the list of one or more IP addresses contains one or more public URL addresses if the resolved address of the VC client indicates that video content transmitted from the VC provider to the VC client will traverse the public Internet; and
   the list of one or more IP addresses contains one or more private URL addresses if the resolved address of the VC client indicates that video content transmitted from the VC provider to the VC client will not traverse the public Internet.

15. The method of claim 14, wherein:

the video content that will traverse the public Internet is Title II video content according to U.S. Cable Communications Policy Act of 1984; and the video content that will not traverse the public internet comprises Title VI video content according to the U.S. Cable Communications Policy Act of 1984.

16. The method of claim 14, wherein the video content that will not traverse the public Internet is configured to be transmitted from the VC provider to the VC client via a dedicated private video handoff link.

17. The VC client of claim 1, wherein:

the VC client is configured with information that a particular range of private vcURL address prefixes indicates private URL addresses corresponding to dedicated private video handoff links; and the VC client is configured to determine whether the selected vcURL address is a public URL address or a private URL address based on a comparison of the selected vcURL address's prefix and the particular range of private vcURL address prefixes.

18. The method of claim 6, wherein:

the VC client is configured with information that a particular range of private vcURL address prefixes indicates private URL addresses corresponding to dedicated private video handoff links; and the VC client determines whether the selected vcURL address is a public URL address or a private URL address based on a comparison of the selected vcURL address's prefix and the particular range of private vcURL address prefixes.

* * * * *

UNITED STATES PATENT AND TRADEMARK OFFICE
CERTIFICATE OF CORRECTION

| | | |
|---|---|---|
| PATENT NO. | : 11,323,782 B1 | Page 1 of 1 |
| APPLICATION NO. | : 17/347719 | |
| DATED | : May 3, 2022 | |
| INVENTOR(S) | : Marek Hajduczenia | |

It is certified that error appears in the above-identified patent and that said Letters Patent is hereby corrected as shown below:

In the Claims

Column 13, Lines 30-32 In Claim 5, please replace "wherein the VC client may be configured to access the public video content via the iv video handoff link." with -- wherein the VC client may be configured to access the public video content via the private video handoff link. --.

Signed and Sealed this
Fourth Day of October, 2022

Katherine Kelly Vidal
*Director of the United States Patent and Trademark Office*